United States Patent
Roullier et al.

(10) Patent No.: US 9,100,888 B2
(45) Date of Patent: Aug. 4, 2015

(54) CELL RESELECTION FOR MULTIPLE SIM DEVICES

(75) Inventors: Sylviane Roullier, Le Mans (FR); Christer Östberg, Staffanstorp (SE); Samuel Lamazure, Moutiers (FR)

(73) Assignee: ST-Ericsson SA, Plan-les-Ouates (CH)

( * ) Notice: Subject to any disclaimer, the term of this patent is extended or adjusted under 35 U.S.C. 154(b) by 229 days.

(21) Appl. No.: 13/994,571

(22) PCT Filed: Nov. 25, 2011

(86) PCT No.: PCT/EP2011/071077
§ 371 (c)(1),
(2), (4) Date: Jan. 2, 2014

(87) PCT Pub. No.: WO2012/079962
PCT Pub. Date: Jun. 21, 2012

(65) Prior Publication Data
US 2014/0106750 A1    Apr. 17, 2014

Related U.S. Application Data

(60) Provisional application No. 61/435,636, filed on Jan. 24, 2011.

(30) Foreign Application Priority Data

Dec. 15, 2010   (EP) .................................... 10306419

(51) Int. Cl.
*H04W 36/16*    (2009.01)
*H04W 48/20*    (2009.01)
*H04W 68/02*    (2009.01)
*H04W 88/06*    (2009.01)

(52) U.S. Cl.
CPC ............ *H04W 36/165* (2013.01); *H04W 48/20* (2013.01); *H04W 68/02* (2013.01); *H04W 88/06* (2013.01)

(58) Field of Classification Search
CPC combination set(s) only.
See application file for complete search history.

(56) References Cited

U.S. PATENT DOCUMENTS

| | | |
|---|---|---|
| 2003/0125073 A1 | 7/2003 | Tsai et al. |
| 2009/0215473 A1 | 8/2009 | Hsu |
| 2011/0117962 A1* | 5/2011 | Qiu et al. ...................... 455/558 |
| 2013/0136072 A1* | 5/2013 | Bachmann et al. .......... 370/329 |
| 2015/0004973 A1* | 1/2015 | Gude et al. ................. 455/435.2 |

FOREIGN PATENT DOCUMENTS

| | | |
|---|---|---|
| CN | 101 179 796 A | 5/2008 |
| CN | 101 217 747 B | 5/2010 |
| CN | 101 827 464 A | 9/2010 |

* cited by examiner

*Primary Examiner* — Diane Mizrahi
(74) *Attorney, Agent, or Firm* — Coats & Bennett PLLC

(57) ABSTRACT

A Multi Subscriber Identity Module (SIM) modem capable of receiving paging messages related to at least two subscriber identities comprises a paging configuration block configured to determine whether a collision between paging occasions related to the respective subscriber identities will be systematic or not, and to launch, when the collision has been determined to be systematic, a reselection of a new cell for at least one of the at least two subscriber identities.

15 Claims, 5 Drawing Sheets

CELL RESELECTION FOR MULTIPLE SIM DEVICES

TECHNICAL FIELD

The present invention relates to multiple subscriber identity/single radio devices and methods for systematic paging collision avoidance. It relates particularly to reselection algorithms used in a cellular telecommunication network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

Dual Subscriber Identity Module (SIM) Dual Standby (DSDS) modems comprise means for receiving paging messages associated with at least two subscriber identities.

Consequently, a DSDS modem can camp on two different cells relating for example to two different networks or, within a same network, relating to two different radio access technologies.

A DSDS modem may not be capable of listening for paging of more than one cell simultaneously. Typically this situation arises when the DSDS modem is associated with (e.g. coupled to, comprised in, or even constituted as) a device providing only a single reception channel at any given time.

Missed paging may lead to missed calls for the user.

This problem may typically be mitigated or at least counteracted by the paging repetition which is commonly applied by networks. The operators may repeat the paging messages, whereby the user equipment has a larger probability to read the paging message and receive the call. It shall be noted that the repetitions typically depend on the network configuration and may, for example, depend on network load.

One problem is experienced when the modem is camped on one or more cells whose paging occasions are constantly (or at least often) colliding. Indeed, in this case, even if the network repeats the paging, there is a non negligible probability of missed calls.

US 2003/125073 discloses a mobile station simultaneously standing by for multiple mobile networks so that the mobile station can receive paging messages from these mobile networks for responding to incoming calls. In order to avoid paging loss, the mobile station selects cells whose corresponding paging occasions of the mobile networks are staggered to camp on.

However, the method described in this document requires prior check of the paging occasion collision on two cells, based on prior knowledge of paging occasion timing.

There is a need for improved methods and devices for avoiding paging collisions in multiple SIM applications.

SUMMARY

To address these needs, a first aspect of the present invention relates to a multi SIM modem capable of receiving paging messages related to at least two subscriber identities, characterized in that it comprises a paging configuration block configured to determine whether a collision between paging occasions related to the respective subscriber identities will be systematic or not, and to launch, when the collision has been determined to be systematic, a reselection of a new cell for at least one of the at least two subscriber identities.

In some embodiments, systematic may refer to any case where the collisions follow a pattern (e.g. colliding every time, one out of two times, one out of three times, two out of three times, two out of five times, etc.).

The determination of whether the collisions will be systematic or not may, for example, be made before any collision has occurred, or when one or more collisions have occurred (e.g. only some collisions or an entire collision pattern). In some embodiments (e.g. the cases when determination is made before any collisions have occurred, i.e. when collision is anticipated), it may be determined that re-selection will not be useful because there is no better cell configuration available. Such determination may be made before or after the launch of the re-selection. If this is the case (and in other situations) it may be beneficial to apply other arbitrations to be able to share the conflicting resources (e.g. arbitration of the cell configuration, or arbitration of resource sharing in the terminal itself between the two or more subscriber identities).

This modem aims to reduce collisions, and thus missed paging messages which may lead to missed calls for the user. The multi SIM modem may comprise a collision detection block configured to detect a collision between paging occasions related to the respective subscriber identities.

In some embodiments, the multi SIM modem is configured to perform reselection by:
  determining, for each subscriber identity, a list of candidate cells for reselection among a list of cells comprising a current serving cell and a set of neighbouring cells,
  evaluating paging conflict rate averages for combinations of candidates cells respectively related to subscriber identities, and
  selecting the cells of the combination having the lowest paging conflict rate average.

The list of candidate cells may comprise cells having a reception power level equal to the power level of an ideal cell having the highest reception power level, or lower than the power level of the ideal cell within a limited gap.

The multi SIM modem may be a Dual SIM Dual Standby (DSDS) modem.

The multi SIM modem may be capable of receiving paging messages from at least two cellular networks and/or using at least two radio access technologies.

The collision detection block may be configured to, when a collision has been detected, send to the paging configuration block a message for indicating the collision.

The paging configuration block may be configured to check, in response to the reception of the message indicating a collision, the paging configurations respectively associated with the two subscriber identities which have caused the collision, to determine whether the collision will be systematic or not.

The multi SIM modem may comprise a modem configuration block adapted to configure the multi SIM modem, the paging configuration module being configured to interrogate the modem configuration block to determine whether the collision will be systematic or not.

The multi SIM modem may further comprise a cellular environment management block configured to select a cell in the environment of the multi SIM modem, the paging configuration block being configured to, when a collision has been determined as systematic, transmit to the cellular environment block a request for selecting a new cell.

A second aspect of the present invention relates to a mobile device comprising a multi SIM modem according to the first aspect, and a reception/transmission block for receiving and/or transmitting signals, the reception/transmission block being coupled to the multi SIM modem.

A third aspect of the present invention relates to a method of cell reselection to avoid systematic collision of a multi SIM modem adapted to receive paging messages at least from two subscribers identities, the method comprising:

determining if a collision between paging occasions related to the respective subscriber identities will be systematic, and when collision is determined as systematic, launch a reselection of a new cell for at least one of the at least two subscriber identities.

The method may comprise a step of detecting a collision between paging occasions related to the respective subscriber identities.

In some embodiments, the reselection comprises:

determining, for each subscriber identity, a list of candidate cells for reselection among a list of cells comprising a current serving cell and a set of neighbouring cells, evaluating a paging conflict rate averages for combinations of candidates cells respectively related to subscriber identities, and selecting the cells of the combination having the lowest paging conflict rate average.

The modem may be a Dual SIM Dual Standby (DSDS) modem.

The method may comprise a step of checking paging configurations respectively associated with the two subscriber identities which have caused the collision for determining whether the collision will be systematic or not.

In some embodiments in which the multi SIM modem comprises a cellular environment management block configured to select a cell in the environment of the mobile device, the method may comprise a step of transmitting to the cellular environment management block a request for selecting a new cell in the direct vicinity of the device when collision has been determined as systematic.

A fourth aspect of the present invention relates to a computer program product comprising a computer readable medium, having thereon a computer program comprising program instructions, the computer program being loadable into a data-processing unit and adapted to cause the data-processing unit to carry out the steps of the method according to the third aspect when the computer program is run by the data-processing unit.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF EMBODIMENTS

Embodiments of the invention deal with the problem of simultaneously using two or more subscriber identities within one single mobile device with one single reception/transmission chain being able to operate at a time. In particular, embodiments of the invention deal with cell reselection schemes to avoid the problem of missed calls due to missed paging.

Figure 1:
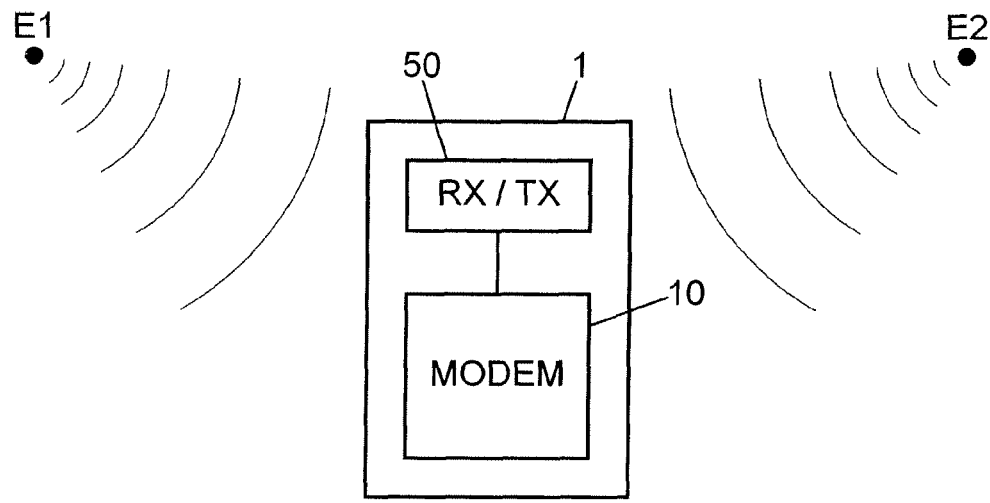
FIG. 1 is a schematic block diagram of a mobile device according to some embodiments of the invention.

FIG. 1 shows a mobile device 1, for example a mobile phone, according to an embodiment of the invention. Mobile device 1 comprises a multi SIM modem 10, for example a Dual SIM Dual Standby (DSDS) modem, and a reception/transmission block 50, for example an antenna system, in order to receive or transmit signals.

Figure 2:
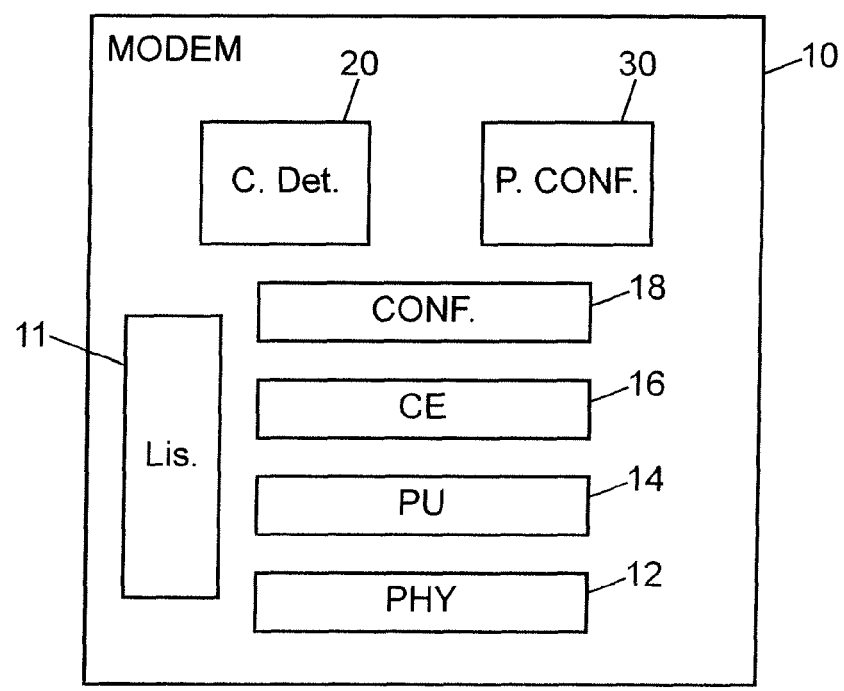
FIG. 2 is a schematic block diagram of a multi SIM modem of the mobile device according to some embodiments.

Referring to FIG. 2, the modem 10 comprises a listening block 11 for listening to paging messages associated with a plurality (two or more) of subscriber identities. Modem 10 also comprises a physical interface block 12 configured to couple the modem 10 with the reception/transmission block 50. Modem 10 further comprises a processing block 14 configured to control other blocks of the modem 10, a cellular environment management block 16 configured to select a cell in the environment of the mobile device 1, and a modem configuration block 18 for configuring the modem 10.

Modem 10 comprises a collision detection block 20 configured to detect a collision on paging occasions, for example from two different cellular networks. Modem 10 further comprises a paging configuration block 30 configured to check the paging configuration associated with different cells.

In the example of FIG. 1, a first cell E1 belonging to a first cellular network and a second cell E2 belonging to a second cellular network are in the direct vicinity of the device 1. Modem 10 is capable of listening to the two cellular networks for paging.

According to other embodiments, the cells E1 and E2 are in the same network but serve different Radio Access Technologies (RAT), or are in the same network and serve the same RAT. For example a user may have on this phone personal and business SIM cards belonging to the same operator.

Modem 10 may receive or emit calls managed by the first cell E1, and receive or emit calls managed by the second cell E2.

In some embodiments, due to physical limitations of the reception/transmission block 50 for example, the modem 10 cannot receive simultaneously a plurality of paging messages used to handle calls in the respective cells.

This event, called paging collision or missed paging, may typically arise when a first paging message sent by the first cell E1 and a second paging message sent by the second cell E2 are emitted almost simultaneously or when the time interval between the sending of the first page and the second page is too short for the modem 10 to receive correctly both pages. Then, at least one amongst the first and the second pages gets dropped.

Figure 3:
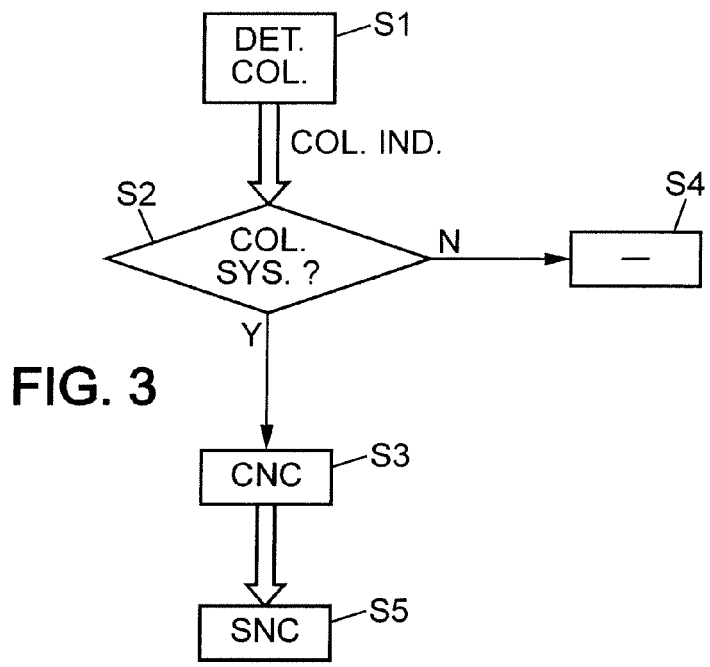
FIG. 3 is a flow chart showing steps of a method of cell reselection to avoid systematic collision according to some embodiments of the invention.
Figure 4:
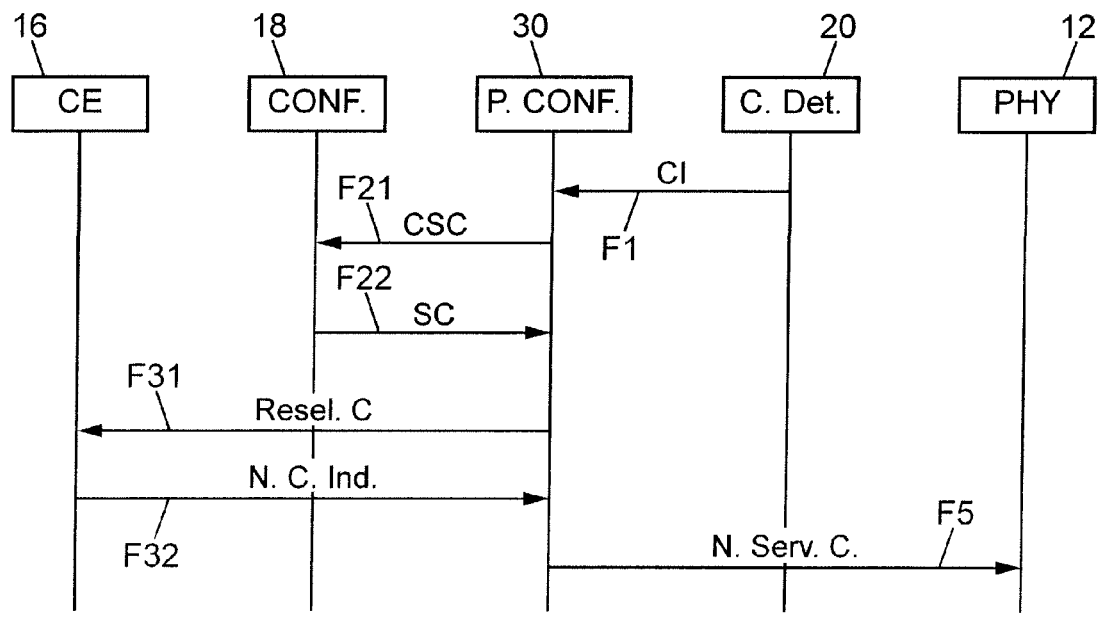
FIG. 4 is a chart which shows an example of cell reselection according to some embodiments.

Referring to FIG. 3 and FIG. 4, we are describing below a method of cell reselection to avoid systematic collisions according to an embodiment of the invention.

In step S1, collision detection block 20 detects a collision between paging occasions. For example, the collision is caused by a first page and a second page sent to the mobile device 1 at the same time, by the respective first cell E1 and second cell E2. Collision detection block 20 then sends to the paging configuration block 30 a message for indicating the collision, as symbolized by the arrow F1 in FIG. 4.

In step S2, paging configuration block 30 checks the paging configurations respectively associated with the two cellular networks which have caused the collision, for detecting whether the collision will be systematic or not. For performing this detection, paging configuration module 30 interrogates the modem configuration block 18, as symbolized by arrow F21 in FIG. 4. In response to this interrogation, modem configuration block 18 checks the modem configuration to determine whether the collision will be systematic between paging messages from first cell E1 and second cell E2.

Systematic collision may be defined in different ways. In some embodiments, a systematic collision is determined in case of collision on each and every paging occasion. In other embodiments, a systematic collision is determined in case of collision on a predetermined number of paging occasions, for example one or two.

Then, modem configuration block 18 sends to the paging configuration block 30 a message indicating whether the collision will be systematic, as symbolized by arrow F22.

In cases where the collision has been detected as systematic, paging configuration block 30 launches a reselection of another cell (step S3). The network on which the cell reselection shall happen is decided in the protocol stack and can be based on different criteria. For example, a new cell is selected for the first cellular network. If collision hasn't been detected as systematic, paging configuration block 30 does nothing (step S4).

In step S3, paging configuration block 30 transmits to the cellular environment block 16 a request for selecting a new cell in the direct vicinity of the device 1, as symbolized by arrow F31 in FIG. 4.

In response to this request, cellular environment management block 16 transmits to the paging configuration module 30 a message indicating a new cell of the first cellular network which is in the direct vicinity of the device 1, as symbolized by arrow F32.

In step S5, paging configuration module 30 transmits to the physical interface block 12 a request for setting the new serving cell selected in step S3, as symbolized by arrow F5. That cell reselection is then performed using known or future suitable methods.

This method thus permits the selection of a new cell when a systematic collision has been detected, which avoids the problem of systematic or recurrent collision, and thus the problem of missed paging.

In some embodiments, one or more of step S1, message F1 and collision detection block 20 are either absent or optional.

Embodiments of the invention have been described using physical subscriber identity modules (SIM cards) as an example of how a subscriber identity may be defined. However, this must not be the case in alternative embodiments. In such alternative embodiments, one or more of the subscriber identities may be provided to the mobile terminal in the form of a SIM software application executed in the terminal, and/or as a virtual SIM which is "stolen" or "borrowed" from another device and is rendered accessible to the terminal by way of an appropriate interface.

Figure 5:
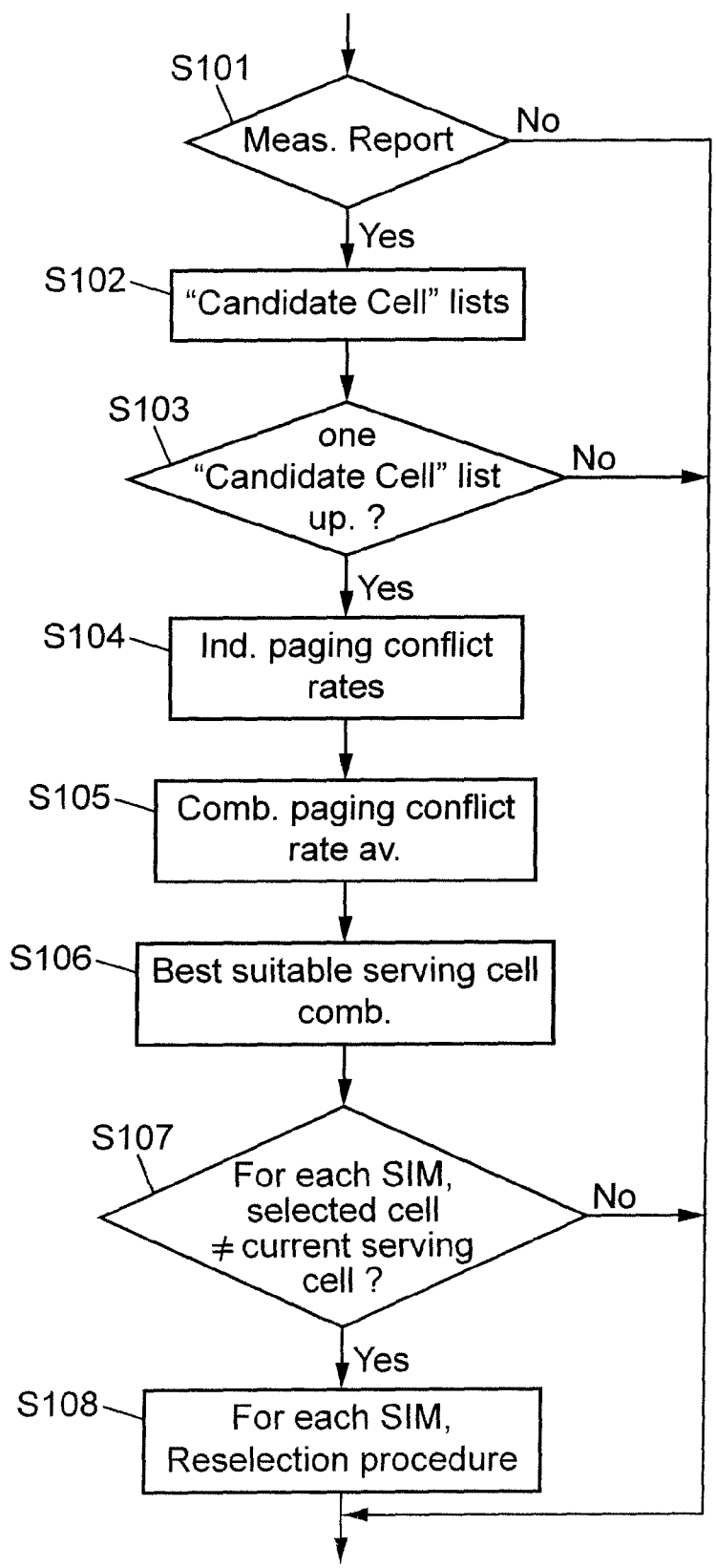
FIG. 5 is a flow chart showing steps of a reselection method according to an example embodiment of the invention.

Referring to FIG. 5, we are describing below an embodiment of reselection method which may be used with the method of cell reselection to avoid systematic collisions described above.

For example, the mobile device comprises a triple SIM Triple Standby (TSTS) modem, with a first subscriber identity module SIM1, a second subscriber identity module SIM2, and a third subscriber identity module SIM3.

For each subscriber identity modules SIM1, SIM2, SIM3, the mobile device is camped on a serving cell and monitoring several neighbouring cells for mobility management.

In step S101, a measurement report is received. Measurement reports are made regularly according to the 3GPP G8M recommendations, e.g. every five seconds in G8M idle mode and every two seconds in GPR8 idle mode. Measurement reports may additionally or alternatively be made according to any other suitable standard recommendations. The measurement report contains information regarding the neighbouring cells and the serving cell reception power levels.

In step S102, for each subscriber identity modules SIM1, SIM2, SIM3, a list of candidate cells is determined from the list of possible cells including the serving cell and the neighbouring cells.

For a given subscriber identity module SIM1, 81M2, 81M3, we call the "ideal cell" the cell with the highest reception power level between the current serving cell and the neighbouring cells, and we call the "candidate cell" a cell which is candidate for reselection procedure.

The candidate cells lists related to subscriber identity modules SIM1, SIM2, SIM3 may be combined in one candidate cell list if it simplifies the implementation.

A cell may be candidate for reselection if its reception power level is equal to or lower than the power level of the ideal cell within a limited gap G.

In order to guarantee a minimum of performance reduction compared to the ideal cell, the gap G value may depend on the ideal cell reception power level. For example, the lower the ideal cell reception power level is, the lower the gap G value becomes. Moreover, if the ideal cell reception power level is below a specified threshold the gap G value is null. In this case the reselection procedure is not applicable. This feature permits to avoid radio link loss on one cell, whereas a better cell is available for camping on.

Figure 7:
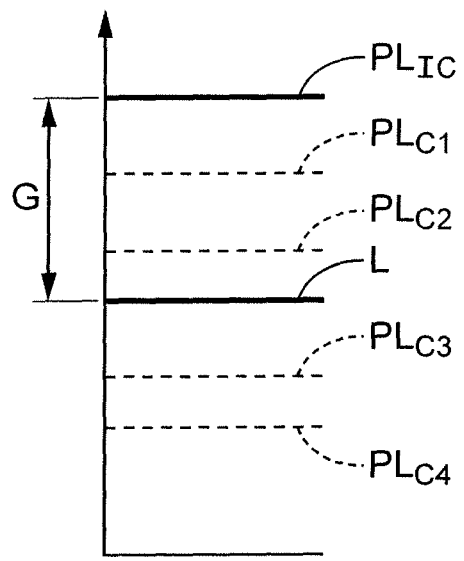
FIG. 7 is a diagram showing an example of ideal cell reception power level and associated gap.

For example, the diagram of FIG. 7 represents the reception power level of the ideal cell $PL_{IC}$, the reception power level of a first neighbouring cell $PL_{C1}$, the reception power level of a second neighbouring cell $PL_{C2}$, the reception power level of a third neighbouring cell $PL_{C3}$, and the reception power level of a fourth neighbouring cell $PL_{C4}$. Line L symbolizes the reception power level of the ideal cell minus the gap G. The reception power level of the first neighbouring cell $PL_{C1}$ and the reception power level of the second neighbouring cell $PL_{C2}$ are above the line L, so the first and second cells are candidates for reselection.

Figure 8:
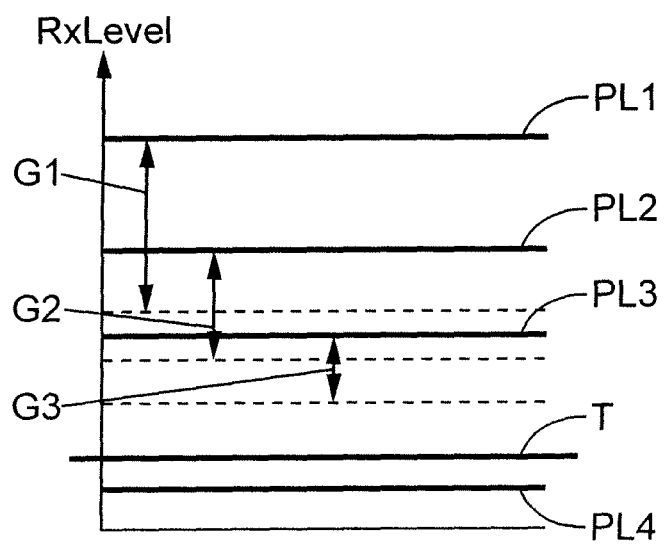
FIG. 8 is a diagram showing embodiments where the gap value depends on the ideal cell reception power level.

FIG. 8 illustrates embodiments where the gap G value depends on the ideal cell reception power level. A first gap value G1 is associated to a first ideal cell reception power level PL1, a second gap value G2 is associated to a second ideal cell reception power level PL2, and a third gap value G3 is associated to a third ideal cell reception power level PL3. As it can be seen, the lower the ideal cell reception power level PL is, the lower the gap G value becomes. Moreover, for an ideal cell reception power level PL4 below a specified threshold T, the gap G value is null.

At each measurement report, the ideal cell related to a subscriber identity may change and the corresponding candidate cell list is then updated. A change of the ideal cell implies a change of the parameters used for defining the candidate cells, i.e. the ideal cell reception power level and the gap G value.

In step S103, the mobile device tests whether at least one candidate cells list has been updated in step S102. If at least one candidate cells list has been updated in step S102 the method goes to step S104. If no candidate cells list has been updated in step S102 the method ended.

In step S104, individual paging conflict rates are evaluated.

A paging block scheduling depends on the selected cell idle mode configuration and the corresponding subscriber identity module identifier number (e.g. IMSI). For a given serving cell (e.g. a GSM cell) of a given subscriber identity module SIM1, SIM2, SIM3, the paging conflict rate depends on:
- the cell paging scheduling and the one of the serving cell of the concurrent subscriber identity module,
- the cell frame time base alignment compared to the one of the serving cell of the concurrent subscriber identity module,
- the cell frame counter alignment compared to the one of the serving cell of the concurrent subscriber identity module.

Once at least one candidate cell list is created or updated, the paging conflict rates have to be individually evaluated for each cell compared to the concurrent subscriber identity module cells.

Figure 6:
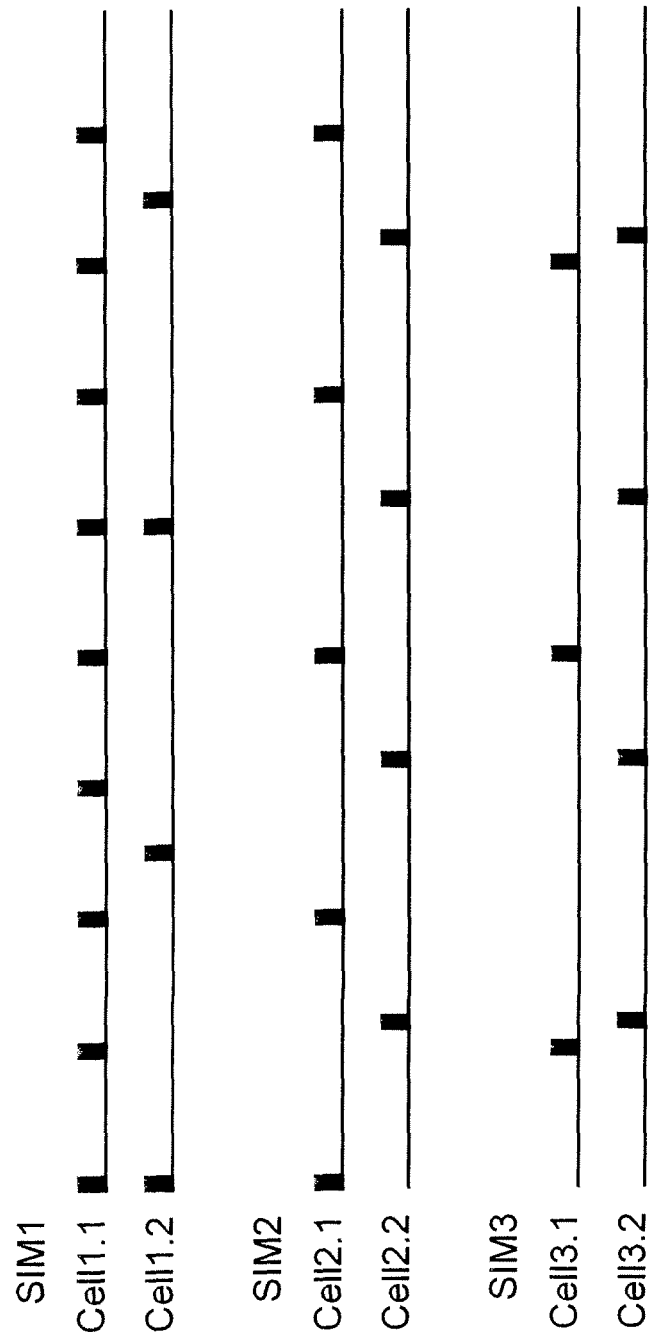
FIG. 6 is a chart which shows an example of six-cell paging scheduling.

FIG. 6 shows an example of six-cell paging scheduling. In this example, there are two candidate cells Cell1.1 and Cell1.2 for the first subscriber identity module SIM1, two candidate cells Cell2.1 and Cell2.2 for the second subscriber identity module SIM2, and two candidate cells Cell3.1 and Cell3.2 for the third subscriber identity module SIM3.

From FIG. 6 it could be noticed that the cell Cell1.1 of the first subscriber identity module SIM1 has 50% of paging conflict with the cell Cell2.1 of the second subscriber identity module SIM2. In the reverse, the cell Cell2.1 has 100% of paging conflict with the cell Cell1.1.

The table below lists the paging conflict percentage of one subscriber identity module cell compared to another cell from a concurrent subscriber identity module:

| | | Percentage of Paging Conflict | | | | |
|---|---|---|---|---|---|---|
| | | SIM 1 | | SIM 2 | | SIM 3 |
| | | Cell 1.1 | Cell 1.2 | Cell 2.1 | Cell 2.2 | Cell 3.1 | Cell 3.2 |
| SIM1 | Cell 1.1 | | | 50 | 0 | 33 | 0 |
| | Cell 1.2 | | | 25 | 0 | 17 | 0 |
| SIM2 | Cell 2.1 | 100 | 20 | | | 17 | 0 |
| | Cell 2.2 | 0 | 0 | | | 0 | 100 |
| SIM2 | Cell 3.1 | 100 | 20 | 25 | 0 | | |
| | Cell 3.2 | 0 | 0 | 0 | 100 | | |
| Reading Way: | The Cell 1.1 has 50% of paging conflict with Cell 2.1 | | | | | | |
| | The Cell 2.1 has 100% of paging conflict with Cell 1.1 | | | | | | |

In step S105, once all the individual paging conflict rates have been determined, the combined paging conflict rate average is computed.

For example, the table below lists all the possible serving cell combinations and the corresponding paging conflict rate average:

| SIM1 | SIM2 | SIM3 | Average of the paging conflict percentage |
|---|---|---|---|
| Cell 1.1 | Cell 2.1 | Cell 3.1 | 54 |
| Cell 1.1 | Cell 2.1 | Cell 3.2 | 25 |
| Cell 1.1 | Cell 2.2 | Cell 3.1 | 22 |
| Cell 1.1 | Cell 2.2 | Cell 3.2 | 33 |
| Cell 1.2 | Cell 2.1 | Cell 3.1 | 21 |
| Cell 1.2 | Cell 2.1 | Cell 3.2 | 8 |
| Cell 1.2 | Cell 2.2 | Cell 3.1 | 6 |
| Cell 1.2 | Cell 2.2 | Cell 3.2 | 33 |

In step S106, the best suitable serving cell combination is extracted. The best suitable serving cell combination has the lowest combined paging conflict rate average.

In the example represented in the table above, the best suitable serving cell combination is the cell Cell1.2 of the first subscriber identity module SIM 1, the cell Cell2.2 of the second subscriber identity module SIM2, and the Cell3.1 of the third subscriber identity module SIM3.

If several serving cell combinations have the lowest paging conflict rate average, the best suitable serving cell combination may be chosen as the one with the highest reception power level average of the selected cells.

In step S107, once the best suitable serving cell combination has been determined, the mobile device tests, for each subscriber identity module, whether the selected cell is different than current serving cell. If all selected cells are the same than the respective current serving cells, the method ended. If not, the method goes to step S108.

In step S108, for each subscriber identity module for which the selected cell is not already the current serving cell, an individual reselection procedure is performed.

A first advantage of this reselection method is to provide a solution to enhance the global multi-SIM Mobile Terminated (MT) call rate of a Multi-SIM Multi Standby (MSMS) product with very low risk of Mobile Station (MS) performance regression. In particular, the candidate cell selection permits to avoid network loss.

A second advantage of this reselection method is that it anticipates some possible conflicts. It has a double effect. Firstly, the anticipation could avoid missing some MT call requests. Secondly, by selecting the lowest combined paging conflict rate average, the remaining paging conflict handling requires less algorithm treatment (i.e. CPU load saving).

The evaluation of paging conflict percentage as described above may be performed based on measuring actual collision occurrences, on prior knowledge of paging occasion scheduling for the various cells (i.e. without any actual collision having to take place), or on a combination thereof.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. A Multi Subscriber Identity Module (SIM) modem capable of receiving paging messages related to at least two subscriber identities, the Multi SIM modem comprising:
   a paging configuration circuit configured to:
      determine whether a collision between paging occasions related to respective subscriber identities will or will not be systematic; and
      launch, when the collision has been determined to be systematic, a reselection of a new cell for at least one of the at least two subscriber identities.

2. The Multi SIM modem of claim 1 further comprising a collision detection circuit configured to detect the collision between paging occasions related to the respective subscriber identities.

3. The Multi SIM modem of claim 2 wherein when a collision has been detected, the collision detection circuit is further configured to send a message indicating the collision to the paging configuration circuit.

4. The Multi SIM modem of claim 3 wherein, responsive to receiving the message indicating the collision, the paging configuration block is further configured to check the paging configurations respectively associated with the subscriber identities that caused the collision to determine whether the collision will or will not be systematic.

5. The Multi SIM modem of claim 4 further comprising a modem configuration circuit configured to configure the Multi SIM modem, and wherein the paging configuration circuit is further configured to interrogate the modem configuration circuit to determine whether the collision will or will not be systematic.

6. The Multi SIM modem of claim 1 wherein the paging configuration circuit is further configured to perform reselection by:
   determining, for each subscriber identity, a list of candidate cells for reselection among a list of cells comprising a current serving cell and a set of neighbouring cells;
   evaluating paging conflict rate averages for combinations of candidates cells respectively related to the at least two subscriber identities; and
   selecting the cells of the combination having the lowest paging conflict rate average.

7. The Multi SIM modem of claim 6 wherein the list of candidate cells comprises cells having a reception power level that is:
   equal to the power level of an ideal cell having the highest reception power level; or
   lower than the power level of the ideal cell within a limited gap (G).

8. The Multi SIM modem of claim 1 wherein the Multi SIM modem comprises a Dual SIM Dual Standby (DSDS) modem.

9. The Multi SIM modem of claim 1 further comprising a cellular environment management circuit configured to select a cell in the environment of the Multi SIM modem, and wherein when the collision has been determined to be systematic, the paging configuration circuit is further configured to transmit a request to select a new cell to the cellular environment circuit.

10. A mobile device comprising:
   a Multi Subscriber Identity Module (SIM) modem comprising:
      a paging configuration circuit configured to:
         determine whether a collision between paging occasions related to respective subscriber identities will or will not be systematic; and
         launch, when the collision has been determined to be systematic, a reselection of a new cell for at least one of the at least two subscriber identities; and
   a reception/transmission circuit operatively coupled to the Multi SIM modem and configured to communicate signals.

11. A method of cell reselection to avoid systematic collision of a Multi Subscriber Identity Module (SIM) modem adapted to receive paging messages at least from two subscribers identities, the method comprising:
   determining, by a Multi SIM modem, whether a collision between paging occasions related to respective subscriber identities will or will not be systematic; and
   when collision is determined to be systematic, reselecting, by the Multi SIM modem, a new cell for at least one of the at least two subscriber identities.

12. The method of claim 11 further comprising detecting, by the Multi SIM modem, the collision between paging occasions related to the respective subscriber identities.

13. The method of claim 11 wherein reselecting, by the Multi SIM modem, a new cell comprises:
   determining, for each subscriber identity, a list of candidate cells for reselection among a list of cells comprising a current serving cell and a set of neighbouring cells;
   evaluating a paging conflict rate average for combinations of candidates cells respectively related to the at least two subscriber identities; and
   selecting the cells of the combination that have the lowest paging conflict rate average.

14. The method of claim 11 further comprising checking, by the Multi SIM modem, paging configurations respectively associated with the subscriber identities that caused the collision to determine whether the collision will or will not be systematic.

15. A computer program product comprising a non-transitory computer readable medium having stored thereon a computer program comprising program instructions, the computer program being loadable into a data-processing device and, when executed by the data-processing device, is configured to control the data-processing device to:
   determine whether a collision between paging occasions related to respective subscriber identities will or will not be systematic; and
   when collision is determined to be systematic, reselect a new cell for at least one of the at least two subscriber identities.

* * * * *